May 23, 1933.  F. R. FILTER  1,910,157
CRANK CASE PIT
Filed Oct. 21, 1926   2 Sheets-Sheet 2
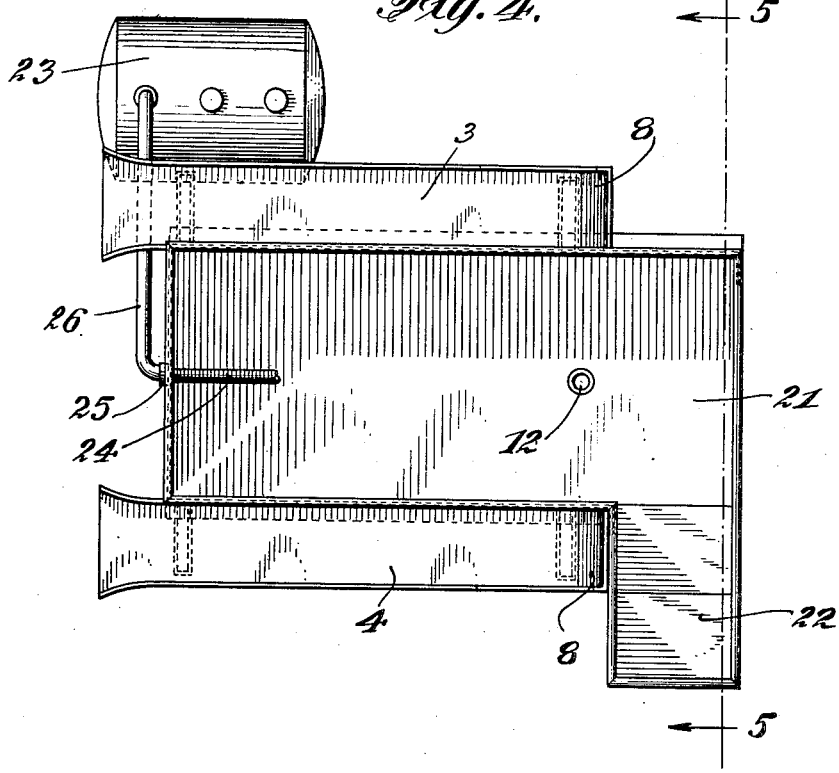
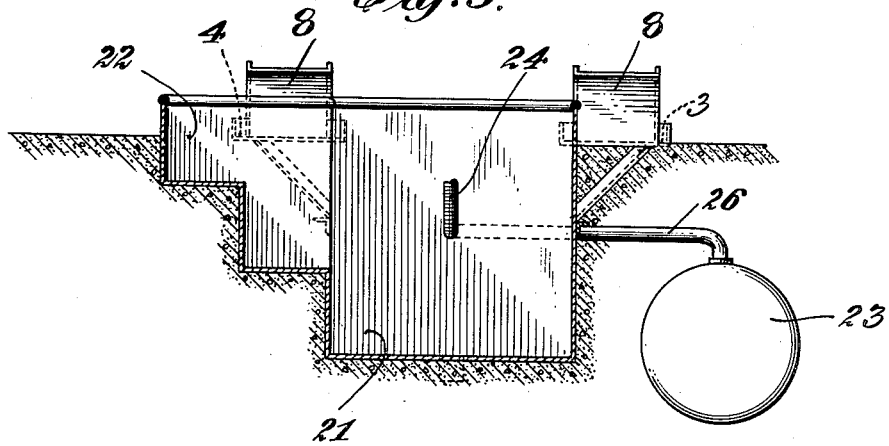

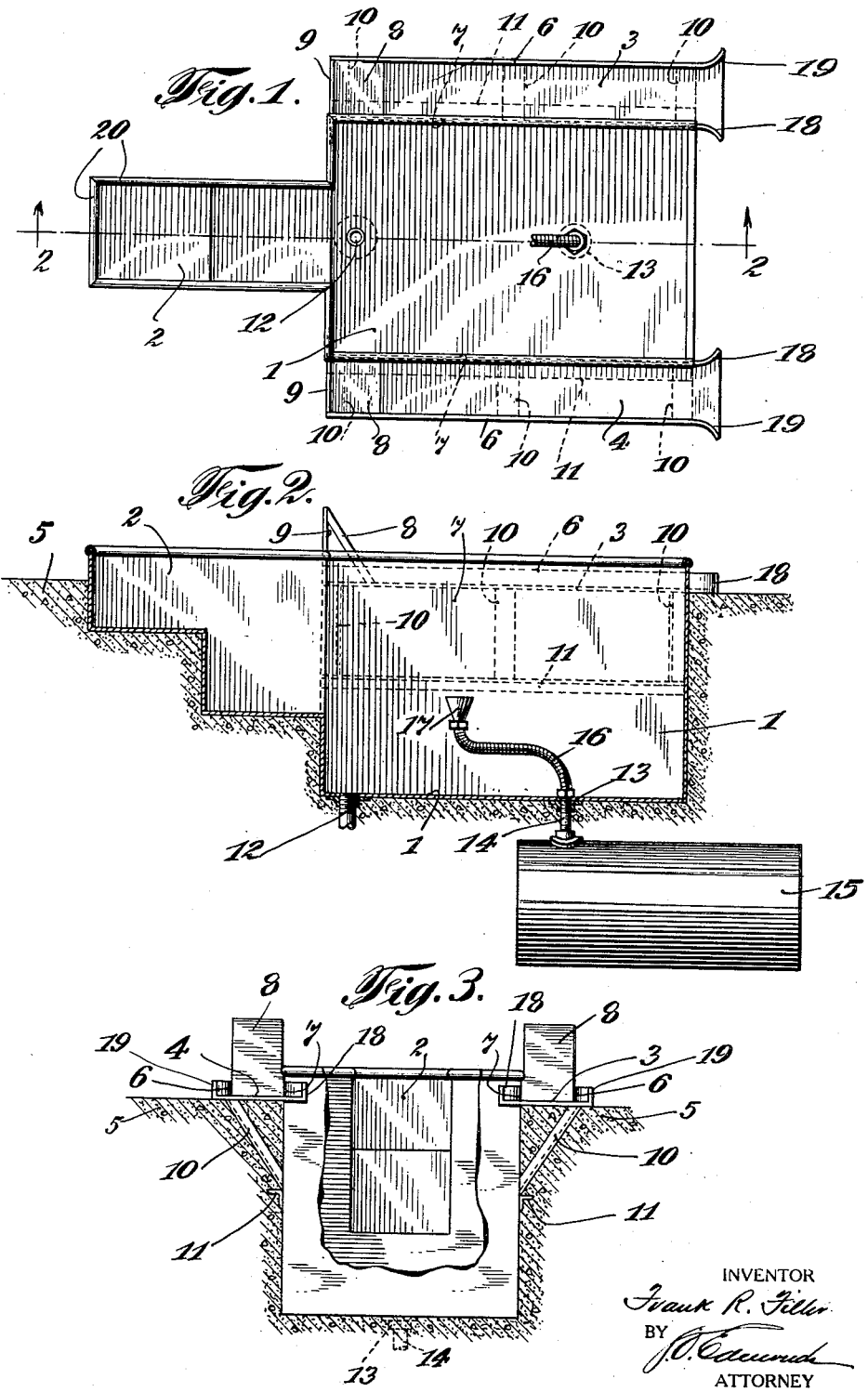

Patented May 23, 1933

1,910,157

UNITED STATES PATENT OFFICE

FRANK R. FILTER, OF BOSTON, MASSACHUSETTS, ASSIGNOR TO SOCONY-VACUUM CORPORATION, OF NEW YORK, N. Y., A CORPORATION OF NEW YORK

CRANK CASE PIT

Application filed October 21, 1926. Serial No. 143,290.

This invention relates to crank case pits which are intended to be used in connection with the servicing of automobiles or other vehicles, for the purpose of examining the condition of the oil in the crank case or to replenish or renew the same.

The principal object of my invention is to provide a pit structure which is of simple and sturdy construction; which is easy to install; requires small amount of space; gives a neat appearance; and is easily kept clean. A further object of my invention is to provide a crank case pit structure which is easy and safe to approach with an automobile or other vehicle to be serviced thereat. A further object of my invention is to provide means for protecting the tires of automobiles or other vehicles approaching the pit from being cut or abraded by exposed portions of the pit construction. Other objects of this invention will be in part obvious and in part pointed out hereinafter.

In accordance with my invention, the pit structure is intended to be sunk into the ground, and is provided along each side with runways which lie flush on the ground. Means are provided at each side of the runways for keeping the vehicle wheels thereon, and bumpers are provided at one end of the runways to prevent the vehicle from being driven beyond suitable position over the pit for convenient servicing. The pit structure is preferably provided with a stepped entrance into the body thereof, affording the service man convenient access into the body of the pit, to service an automobile in position thereover, or to clean the pit, or for other purposes.

In order that a clearer understanding of this invention may be had, attention is hereby directed to the accompanying drawings, forming a part of this application and illustrating certain possible embodiments of my invention.

Referring to the drawings, Fig. 1 is a top view of a pit structure embodying my invention; Fig. 2 is a longitudinal sectional view thereof, and is taken on the line 2—2 of Fig. 1; Fig. 3 is a front view thereof, with the front wall partly broken away; Fig. 4 is a top view of a pit structure embodying a modification of the invention; and Fig. 5 is a sectional view thereof, and is taken on the line 5—5 of Fig. 4.

Similar reference characters refer to similar parts throughout the several views of the drawings.

Referring to the drawings, the construction includes a pit portion 1, an entrance portion 2, and side runways 3 and 4. Any suitably rigid material may be employed for the construction, although metal is preferred. For instance, the pit structure may be built up of metal plates welded together. The pit and entrance structure are intended to be sunk into the ground 5, down to the runways 3 and 4, so that these runways will rest on the ground. These runways are preferably provided with flanges 6 and 7 along opposite edges, which serve to keep the wheels of a vehicle moving on the runways from leaving the same. Bumper plates 8 are supported at the inner ends of these runways, to prevent the vehicle from over-running the proper position over the pit. These bumpers 8 may be reinforced and supported by means of braces, such as 9.

In addition to the runways 3 and 4 being supported on the ground, they may be further supported by means of brace members 10, which at their lower ends are disposed against the sides of the pit structure over angle irons 11, which extend along the sides of the pit. These angle irons also reinforce the side walls of the pit structure.

The bottom of the pit structure is provided with a drain opening 12 leading to a blind well or other open drain, so that any water or other liquid coming onto the bottom of the pit will drain out by gravity. There is also another opening 13 in the bottom of the pit structure, in which is preferably secured a conduit 14 leading to a tank or other suitable receptacle 15, lower than the bottom of the pit. This receptacle is intended to receive oil drained from the crank cases of automobiles serviced at the pit. In rendering this oil service, the service man manipulates flexible tube 16, which is connected to the conduit 14, to bring a funnel 17 at the end of this tube beneath the drain cock of the automobile being serviced. The service man then opens this drain cock, and the oil draining out is caught by the funnel 17 and drained through the hose 16 and conduit 14 into the waste oil tank 15.

The receptacle 15 may be emptied from time to time by detaching the hose 16 and pumping the oil out through the pipe 14.

In order to facilitate bringing the automobile or other vehicle into proper position over the pit, the guard flanges 6 and 7 of the runways 3 and 4 are preferably flared outwardly at the outer ends of the runways, as at 18, 19.

When the pit structure is composed of metal plates, the edges of these plates are apt to be rough, and to protect the vehicle wheels and the service man's hands from being cut or scratched by these edges, it is advisable to cover them with some sort of a shield or guard. Such protection may take the form of a split tube of wood, rubber, metal, or other suitable fabric, placed about and along the exposed edges of these plates, as shown at 20.

When an automobile is being serviced, water drained therefrom may be allowed to fall to the bottom of the pit, from whence it will automatically drain out through the drain 12.

From the above, it will be readily apparent that it is an exceedingly simple matter to drive an automobile into proper position on the pit, and that safety is assured, because the guard rails 6 and 7 will prevent the wheels of the automobile from going into the pit itself. The bumper plates 8 prevent the automobile from being driven too far.

The construction is conducive to cleanliness, because no oil need drip upon the bottom of the pit, but can be caught conveniently in the funnel 17, from whence it will flow into the tank 15. The pit structure is roomy, and has a convenient entrance, which is not blocked when an automobile is in position for servicing. The whole construction occupies small space; is easy to instal; and is sturdy and light in construction. The sheathing of the exposed edges of the metal plates protects the tires of the vehicles, as well as the hands and clothes of the service man, from being injured by contact with the exposed portions of the construction. Other advantages, it is believed, will be readily apparent to a person skilled in this art.

In the modification shown in Figs. 4 and 5, the entrance 22 into the pit structure 21 is from the side instead of from the rear, the entrance being beyond the bumper ends of the runways. The tank 23 used for taking care of the oil is located alongside of the pit instead of below the pit, thus saving in the amount of excavation necessary and in the amount of piping required. In this case the flexible drain tube 24 connects with an outlet located, as at 25, in one of the vertical walls of the pit, this outlet being connected to tank 23 by pipe 26.

As many changes could be made in the above construction and as many apparently widely different embodiments of this invention could be made without departing from the scope thereof, it is intended that all matter contained in the above description or shown in the accompanying drawings shall be interpreted as illustrative and not in a limiting sense.

What I claim is:—

1. A construction of the character described, including a metallic pit structure sunk into the ground and having horizontal runways at each side flush with the surface of the ground, said runways having exposed edges, a shield member covering said exposed edges, and a bumper at one end of each runway.

2. A construction of the character described, including a metallic pit structure sunk into the ground and having horizontal runways at each side flush with the surface of the ground, and braces extending between the pit walls and the runways supporting the same.

3. A construction of the character described, including a pit structure sunk into the ground and having horizontal runways at each side flush with the surface of the ground, braces extending between the pit and the runways supporting the same, and reinforcing strips along the sides of the pit on which the lower ends of said braces rest.

4. A construction of the character described, including a sheet metal pit structure sunk into the ground, said pit structure having horizontal runways at each side thereof flush with the surface of the ground, and split tubular members embracing the exposed edges of said sheet metal pit structure and horizontal runways.

5. A construction of the character described, including a sheet metal pit structure, said pit structure including an enlarged pit portion and a contracted stepped entrance portion leading into the pit portion, and a reinforcing angle iron secured along each side of the pit.

6. As an article of manufacture, a unitary automobile service pit and grease rack comprising a metallic open trough member, channel bars mounted on the sides of the trough and below the top thereof to comprise trackways, and in such manner that the top of the trough becomes a wheel guide, and metallic steps at one end wall of said trough member.

7. As an article of manufacture; a unitary drain pit and grease rack for automobiles comprising an elongated trough adapted to be set into the ground, said trough having ends, sides, and a bottom, all permanently secured together, one end comprising steps forming an entrance to the trough; and elongated members permanently secured to the upper portion of said side walls, said members being shaped to form runways for rubber tired automobile wheels, whereby an automobile may be run into position over the trough to be serviced.

8. As an article of manufacture, an automobile drain pit and grease rack comprising an open metallic trough, wheel guides supported adjacent the longitudinal edges of said trough, one end of said wheel guides being provided with flaring guide side walls to facilitate and guide wheels into said wheel guides, and bumper means at the opposite end of said wheel guides to stop a vehicle at the desired position on said wheel guides.

9. As an article of manufacture, an automobile drain pit and grease rack comprising an open trough, wheel guides integrally secured to longitudinal top side walls of said pit, brace members secured to the outer edges of said wheel guides and attached to the side walls of said pit, all of said parts being permanently secured together.

10. As an article of manufacture; a unitary automobile service pit comprising boiler plate ends, boiler plate side walls and a boiler plate bottom, all permanently secured together and one end comprising steps forming an entrance to the trough; a pair of channel-shaped elongated metal members secured to the side walls to form runways for the wheels of an automobile whereby an automobile may be run into position over said trough to be serviced, said channel members being positioned below the upper edges of the side walls; and supporting brackets attached to the side walls and to the runways to form supports for the runways.

11. As an article of manufacture; an automobile service pit comprising boiler plate ends, boiler plate side walls and a boiler plate bottom, all permanently secured together; a drain funnel within the pit; and a conduit leading from the funnel to the exterior of the pit whereby liquid drained into the funnel will be conducted to a point outside of the pit, said conduit supporting the funnel and being swivel jointed to permit the funnel to be readily moved out of the way or into position to receive oil drained from an automobile being serviced.

12. As an article of manufacture, an automobile drain pit and grease rack comprising an open metallic trough member, wheel guides supported adjacent the longitudinal edges of said trough member, one end of said wheel guides being provided with flaring guide side walls to facilitate and guide wheels into said wheel guides, and bumper means at the opposite end of said wheel guides to stop a vehicle at the desired position on said wheel guides.

This specification signed this 8th day of October, 1926.

FRANK R. FILTER.